(12) United States Patent
McCarty (10) Patent No.: US 10,724,642 B2
(45) Date of Patent: Jul. 28, 2020

(54) MODULAR VALVE TRIM ASSEMBLY FOR USE IN A PROCESS CONTROL VALVE

(71) Applicant: FISHER CONTROLS INTERNATIONAL LLC, Marshalltown, IA (US)

(72) Inventor: Michael W. McCarty, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 6 days.

(21) Appl. No.: 15/961,582

(22) Filed: Apr. 24, 2018

(65) Prior Publication Data

US 2018/0340616 A1     Nov. 29, 2018

Related U.S. Application Data

(63) Continuation of application No. 62/510,086, filed on May 23, 2017.

(51) Int. Cl.
*F16K 1/42* (2006.01)
*B23P 15/00* (2006.01)
(Continued)

(52) U.S. Cl.
CPC .............. *F16K 1/42* (2013.01); *B23P 15/001* (2013.01); *F15B 13/0835* (2013.01);
(Continued)

(58) Field of Classification Search
CPC ... F16K 1/42; F16K 3/246; F16K 1/00; F16K 1/32; F16K 1/36; B23P 15/001;
(Continued)

(56) References Cited

U.S. PATENT DOCUMENTS 712,929 A      11/1902   Hedstrom
1,988,966 A  *  1/1935   Eckhouse ............... F16K 1/425
                                                137/454.6
(Continued)

FOREIGN PATENT DOCUMENTS

DE     102015005977 A1    11/2016
DE     102015011551 B3     3/2017
(Continued)

OTHER PUBLICATIONS

International Search Report and Written Opinion for International Application No. PCT/US2018/031736, dated Aug. 6, 2018.

*Primary Examiner* — John Bastianelli
(74) *Attorney, Agent, or Firm* — Marshall, Gerstein & Borun LLP (57) ABSTRACT

A unitary valve trim assembly that can be easily installed in and removed from a valve body of a process control valve. The valve trim assembly includes a valve cage and a valve seat. The valve cage has a first projection that extends in a first direction that is perpendicular to a longitudinal axis of the valve cage. The valve seat has a second projection that extends in a second direction, opposite the first direction, that is perpendicular to the longitudinal axis. The second projection is arranged to engage the first projection to removably couple the valve seat to the valve cage.

21 Claims, 5 Drawing Sheets

(51) Int. Cl.
*F16K 3/24* (2006.01)
*F15B 13/08* (2006.01)

(52) U.S. Cl.
CPC ......... *F16K 3/246* (2013.01); *Y10T 137/7504* (2015.04); *Y10T 137/7668* (2015.04)

(58) Field of Classification Search
CPC ......... Y10T 137/7668; Y10T 137/7504; Y10T 137/6011; F15B 13/0835
USPC ......... 251/318, 363, 367; 137/315.11, 454.2, 137/454.6
See application file for complete search history.

(56) References Cited

U.S. PATENT DOCUMENTS

| | | | | |
|---|---|---|---|---|
| 2,069,013 | A * | 1/1937 | Nordstrom | F16K 5/222 137/246.18 |
| 2,390,134 | A * | 12/1945 | Bennett Svirsky | F16K 31/26 137/216 |
| 2,569,023 | A * | 9/1951 | Sanford | F16K 41/023 251/214 |
| 2,727,715 | A * | 12/1955 | Tuthill | F16K 27/0263 251/129.15 |
| 3,094,137 | A * | 6/1963 | Burke | B21C 37/298 137/318 |
| 3,599,934 | A * | 8/1971 | Reed | F16K 1/42 251/303 |
| 3,666,236 | A * | 5/1972 | Gachot | F16K 1/2266 251/306 |
| 4,469,123 | A * | 9/1984 | Merrill | F16K 43/00 137/315.11 |
| 4,529,330 | A | 7/1985 | Boski | |
| 4,617,963 | A * | 10/1986 | Stares | F16K 47/08 137/625.3 |
| 6,557,825 | B2 * | 5/2003 | Stone | F16J 15/064 251/152 |
| 6,637,452 | B1 * | 10/2003 | Alman | F16K 3/243 137/244 |
| 9,038,664 | B2 * | 5/2015 | McCarty | F16K 1/427 137/625.37 |
| 2002/0017327 | A1 * | 2/2002 | Kawaai | F16J 9/08 137/625.3 |
| 2009/0218536 | A1 | 9/2009 | Wears et al. | |
| 2012/0319027 | A1 * | 12/2012 | Dobbs | F16K 3/246 251/359 |
| 2014/0264135 | A1 | 9/2014 | Bell | |
| 2014/0264138 | A1 | 9/2014 | Bell | |

FOREIGN PATENT DOCUMENTS

| WO | WO-2009067366 A1 | 5/2009 |
|---|---|---|
| WO | WO-2015057970 A1 | 4/2015 |

\* cited by examiner

MODULAR VALVE TRIM ASSEMBLY FOR USE IN A PROCESS CONTROL VALVE

FIELD OF THE DISCLOSURE

The present disclosure is directed to process control valves and, more particularly, to a modular or unitary valve trim assembly for use in a process control valve.

BACKGROUND

Process control systems often employ sliding stem valves, such as gate valves, globe valves, diaphragm valves, pinch valves, etc., to control the flow of process fluids. Sliding stem valves typically include a valve body that defines a fluid flow path, a valve seat installed in the valve body, a closure member (e.g., a valve plug) disposed in the valve body, and a valve stem that operatively couples the closure member to an actuator that moves the closure member relative to the valve seat to control fluid flow through the fluid flow path. Sliding stem valves often include a sealing element arranged between the valve seat and the valve body to prevent leakage therebetween, and a valve cage to provide and/or achieve certain flow characteristics of the process fluid flowing therethrough. The valve cage, which can be dropped in the valve body onto the valve seat and the sealing element or can be integrally formed with the valve seat and the sealing element, typically surrounds the closure member to provide stability, balance, and alignment to the closure member. The valve seat, the cage, the closure member, and the valve stem are retained in the desired position by a bonnet that is removably secured to the valve body and accommodates the valve stem (which can then be coupled to the actuator).

SUMMARY

In accordance with one exemplary aspect of the present invention, a unitary valve trim assembly is provided that can be easily installed in and removed from a valve body of a process control valve. The valve trim assembly includes a valve cage and a valve seat. The valve cage has a first projection that extends in a first direction that is perpendicular to a longitudinal axis of the valve cage. The valve seat has a second projection that extends in a second direction, opposite the first direction, that is perpendicular to the longitudinal axis. The second projection is arranged to engage the first projection to removably couple the valve seat to the valve cage. When the second projection engages the first projection to removably couple the valve seat to the valve cage, the valve seat is movable relative to the valve cage in an axial direction along the longitudinal axis of the valve cage without moving the valve seat or the valve cage in a radial direction perpendicular to the axial direction.

In accordance with another exemplary aspect of the present invention, a unitary valve trim assembly is provided that can be easily installed in and removed from a valve body of a process control valve. The valve trim assembly includes a valve cage, a valve seat, and a sealing element. The valve cage defines a longitudinal axis and has a first projection. The valve seat has a second projection arranged to engage the first projection to removably couple the valve seat to the valve cage. When the second projection engages the first projection to removably couple the valve seat to the valve cage, the valve seat is movable relative to the valve cage in an axial direction along the longitudinal axis of the valve cage without moving the valve seat or the valve cage in a radial direction perpendicular to the axial direction. The sealing element has a third projection arranged to engage a fourth projection of the valve seat to removably couple the sealing element to the valve seat.

In accordance with another exemplary aspect of the present invention, a method of assembling a process control valve is provided. The method includes selecting a valve body defining an inlet, an outlet, and a fluid flow passageway defined between the inlet and the outlet; selecting a valve cage defining a longitudinal axis and having a first projection; selecting a valve seat having a second projection; and selecting a sealing element having a third projection. The method also includes removably coupling the valve seat to the valve cage by positioning the second projection into engagement with the first projection, and removably coupling the sealing element to the valve seat by positioning the third projection into engagement with a fourth projection of the valve seat, thereby forming a unitary valve trim assembly. When the second projection engages the first projection to removably couple the valve seat to the valve cage, the valve seat is movable relative to the valve cage in an axial direction along the longitudinal axis of the valve cage without moving the valve seat or the valve cage in a radial direction perpendicular to the axial direction. The method further includes installing the valve trim assembly in the valve body.

In further accordance with any one or more of the foregoing exemplary aspects of the present invention, a unitary valve trim assembly or a method of assembling a process control valve may further include, in any combination, any one or more of the following preferred forms.

In one preferred form, the first projection extends radially outward, and wherein the second projection extends radially inward.

In another preferred form, the first projection comprises a first thread, and wherein the second projection comprises a second thread.

In another preferred form, the second projection is captured in a gap formed between the first projection and a shoulder of the valve cage. The second projection is movable in the gap without moving the valve seat or the valve cage in the radial direction.

In another preferred form, the valve cage has an end seated against a portion of the valve seat, the first projection being disposed between the end and a shoulder of the valve cage.

In another preferred form, a sealing element is removably coupled to the valve seat.

In another preferred form, the sealing element has a third projection has arranged to engage a fourth projection of the valve seat to removably couple the sealing element to the valve seat. When the third projection engages the fourth projection to removably couple the sealing element to the valve seat, the sealing element is movable relative to the valve seat in the axial direction without moving the sealing element or the valve seat in the radial direction.

In another preferred form, the third and fourth projections extend in opposite directions.

In another preferred form, the sealing element surrounds a portion of the valve seat.

In another preferred form, the sealing element includes a spiral wound gasket.

In another preferred form, the first and third projections extend in a first direction that is perpendicular to a longitudinal axis of the valve cage, and the second and fourth projections extend in a second direction, opposite the first direction, that is perpendicular to a longitudinal axis of the valve cage.

In another preferred form, the first and third projections each extend radially outward, and the second and fourth projections each extend radially inward.

In another preferred form, the third projection is captured in a gap formed between the fourth projection and a shoulder of the valve seat. The third projection is movable in the gap without moving the sealing element or the valve seat in the radial direction.

In another preferred form, removably coupling the valve seat to the valve cage includes rotating the second projection into engagement with the first projection.

In another preferred form, removably coupling the sealing element to the valve seat includes rotating the third projection into engagement with the fourth projection.

In another preferred form, the valve trim assembly is removed by pulling the valve cage out of the valve body.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several FIGS., in which:

DETAILED DESCRIPTION

The present disclosure is directed to a unitary or modular trim assembly for use in a process control valve (e.g., a sliding stem valve) of a process control system. The unitary trim assembly includes a valve cage, a valve seat that can be loosely but removably secured to the valve cage in a quick and easy manner (e.g., without special tooling or fixtures), and a sealing element that can be loosely but removably secured to the valve seat in a similarly quick and easy manner. The components of the trim assembly can be assembled outside of the valve body, i.e., integrated into a single body or unit prior to usage or installation in the process control valve, such that the components of the assembly can be quickly and easily transported and installed together. Indeed, the components of the unitary trim assembly can be installed in the valve body by simply inserting or dropping the unitary trim assembly into the valve body and arranging the assembly in the proper position within the valve body. The components of the unitary trim assembly can likewise be removed from the valve body at the same time by simply grasping a portion of the assembly (e.g., the valve cage) and pulling the assembly out of the valve body. Once removed, one or more components of the unitary trim assembly can be separated therefrom in a quick and easy manner, thereby facilitating the repair or replacement of any damaged components.

The disclosed unitary trim assembly offers several advantages. First, the integration of the valve cage, the valve seat, and the sealing element into one unit eliminates the potential for misalignment, and thus leakage, that currently exists when these trim components are separately and individually installed in the valve body, and a bonnet is subsequently and separately coupled to the valve body to retain the trim components in the proper position. At the same time, unlike known one-piece integral cage and seat ring designs, one or more components of the presently disclosed valve trim assembly can be re-positioned relative to one another (while still attached to one another) and can be individually repaired or replaced when necessary (as opposed to the entire valve trim assembly, which can be quite costly). Indeed, the latter can be quickly and easily done by removing the assembly from the valve body, removing the damaged component(s), repairing or finding a replacement for the damaged component, reattaching the repaired or new component, and re-installing the valve trim assembly in the valve body.

Figure 1:
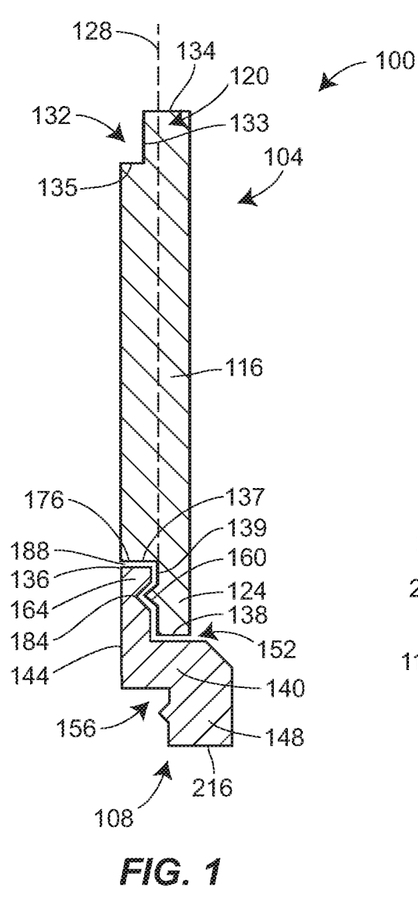
FIG. 1 is a cross-sectional view of a first portion of a first example of a modular valve trim assembly constructed in accordance with the principles of the present invention.
Figure 2:
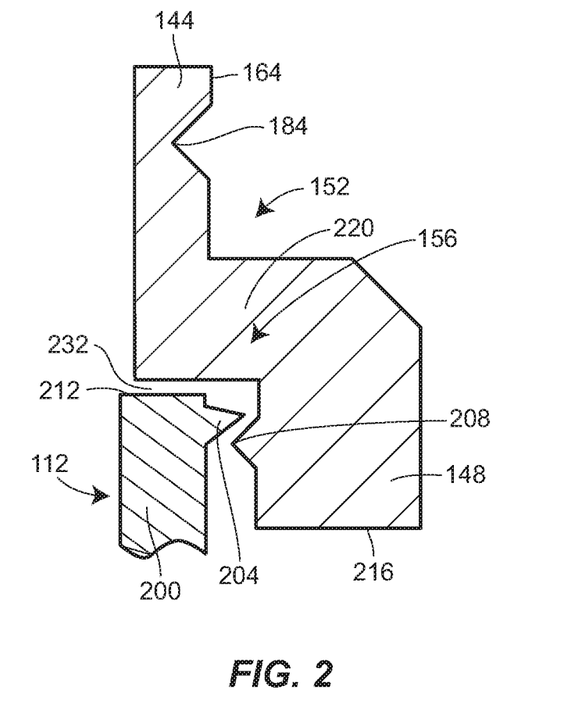
FIG. 2 is a cross-sectional view of a second portion of the modular valve trim assembly.

FIGS. 1 and 2 illustrate one example of a unitary or modular valve trim assembly 100 constructed in accordance with the principles of the present invention. The modular valve trim assembly 100 in this example includes a valve cage 104, a valve seat 108, and a sealing element 112. The valve seat 108 can be loosely but removably secured to the valve cage 104, and the sealing element 112 can likewise be loosely but removably secured to the valve seat 108, such that the components of the valve trim assembly 100 are integrated into a single body or unit (thereby facilitating transport and installation) but are movable relative to one another and are easily separable for replacement or repair when necessary. In other examples, the modular valve trim assembly 100 can also include a fluid flow control member (e.g., a valve plug), a valve stem, additional sealing elements, and/or other trim components. It will be appreciated that in these other examples, any additional components will also be integrated into the single body or unit but can be easily separated for replacement or repair when necessary.

As illustrated in FIG. 1, the valve cage 104 in this example includes a generally cylindrical cage wall 116, a first or upper mounting flange 120, and a second or lower mounting flange 124. The cage wall 116 defines a longitudinal axis 128 of the valve cage 104 and, while not illustrated in FIG. 1, includes one or more apertures that facilitate fluid flow therethrough. The first mounting flange 120 extends axially outward (upward, in FIG. 1) from the cage wall 116 in a direction along or parallel to the longitudinal axis 128. A first or upper annular recess 132 is defined or formed at or proximate a first or upper end 134 of the valve cage 104, and, more specifically, by and between a first shoulder 135 of the valve cage 104 (defined by the cylindrical cage wall 116) and a second shoulder 133 of the valve cage 104 (defined by the first mounting flange 120). The second mounting flange 124 extends axially outward (downward, in FIG. 1) from the cage wall 116 in a direction along or parallel to the longitudinal axis 128 (but in a direction opposite the first mounting flange 120). A second or lower annular recess 136 is defined or formed at or proximate a second or lower end 138 of the valve cage 104, and, more specifically, by and between a third shoulder 137 of the valve cage 104 (defined by the cylindrical cage wall 116) and a fourth shoulder 139 of the valve cage 104 (defined by the second mounting flange 120).

As also illustrated in FIG. 1, the valve seat 108 in this example includes a ring-shaped body 140, a first or upper mounting flange 144, and a second or lower mounting flange 148. The first mounting flange 144 extends axially outward (upward, in FIG. 1) from the ring-shaped body 140 in a direction along or parallel to the longitudinal axis 128. The first mounting flange 144 preferably has a width that is smaller than a width of the second mounting flange 124 of the valve cage 104, but preferably has a length that is substantially equal to a length of the second mounting flange 124. The valve seat 104 also includes a first or upper annular recess 152 defined by and between the ring-shaped body 140 and the first mounting flange 144. As illustrated, the first annular recess 152 is thus arranged to receive the second mounting flange 124 of the valve cage 104. The second mounting flange 148 extends axially outward (downward, in FIG. 1) from the ring-shaped body 140 in a direction along or parallel to the longitudinal axis 128 (but in a direction opposite the first mounting flange 144). The valve seat 108 also includes a second or lower annular recess 156 defined by and between the ring-shaped body 140 and the second mounting flange 148.

To allow the valve cage 104 and the valve seat 108 to be loosely but removably secured to one another in the manner described above, the valve cage 104 includes a projection 160 and the valve seat 108 includes a projection 164 arranged to engage the projection 160 (and vice-versa). The projections 160, 164 can be formed using traditional manufacturing techniques or additive manufacturing techniques. The additive manufacturing technique may be any additive manufacturing technique or process that builds three-dimensional objects by adding successive layers of material on a material. The additive manufacturing technique may be performed by any suitable machine or combination of machines. The additive manufacturing technique may typically involve or use a computer, three-dimensional modeling software (e.g., Computer Aided Design, or CAD, software), machine equipment, and layering material. Once a CAD model is produced, the machine equipment may read in data from the CAD file and layer or add successive layers of liquid, powder, sheet material (for example) in a layer-upon-layer fashion to fabricate a three-dimensional object. The additive manufacturing technique may include any of several techniques or processes, such as, for example, a stereolithography ("SLA") process, a fused deposition modeling ("FDM") process, multi-jet modeling ("MJM") process, a selective laser sintering ("SLS") process, an electronic beam additive manufacturing process, and an arc welding additive manufacturing process. In some embodiments, the additive manufacturing process may include a directed energy laser deposition process. Such a directed energy laser deposition process may be performed by a multi-axis computer-numerically-controlled ("CNC") lathe with directed energy laser deposition capabilities.

The projection 160 in this example takes the form of a single thread that extends radially outward from the valve cage 104 in a direction perpendicular to the longitudinal axis 128. More particularly, the projection 160 extends radially outward from the second mounting flange 124 at a position proximate the lower end 138 of the valve cage 104, and, even more particularly, between the third shoulder 137 of the cage wall 116 and the lower end 138 of the valve cage 104. The projection 160 thus has a portion that protrudes into the second or lower annular recess 136, thereby dividing the second annular recess 136 into a first or upper portion and a second or lower portion.

The projection 164 in this example also takes the form of a single thread, but the projection 164 extends radially inward from the valve seat 108 (rather than radially outward, as the projection 160 does). Thus, the projection 164 also extends in a direction substantially perpendicular to the longitudinal axis 128, but in a direction opposite the projection 160. The projection 164 extends radially inward from a first or upper end 176 of the valve seat 108, and, more particularly, from an upper end of the first mounting flange 144 of the valve seat 108. In other examples, the projection 164 can be positioned differently (e.g., positioned away from but proximate the first end 176).

With reference still to FIG. 1, the process of loosely and removably securing the valve cage 104 and the valve seat 108 together generally involves arranging the first mounting flange 144 of the valve seat 108 at least partially within the second annular recess 136 of the valve cage 104 such that (1) the projection 164 is captured within the first portion of the annular recess 136 and engages (e.g., threadingly engages) the projection 160, and (2) the projection 160 also engages an undercut 184 formed in the first mounting flange 144 of the valve seat 108 immediately adjacent (below, in FIG. 1) the projection 164. In this example, arranging the first mounting flange 144 of the valve seat 108 in this manner involves rotating the first mounting flange 144 of the valve seat 108, particularly the projection 164, beyond the projection 160. In other examples, the second mounting flange 124 of the valve cage 104 can be rotated (instead of the first mounting flange 144 of the valve seat 108) or the first mounting flange 144 can be positioned in the proper place in a different manner. In any event, when so arranged, there exists a small gap 188 between the third shoulder 137 of the valve cage 104 and the projection 164, thereby allowing the portion of the first mounting flange 144 of the valve seat 108 positioned above the projection 160 to move (e.g., float), within the gap 188, while the valve cage 104 and the valve seat 108 are attached to one another. Thus, for example, the valve seat 108 is movable relative to the valve cage 104 (and vice-versa) in an axial direction along the longitudinal axis 128 without moving (e.g., rotating) the valve seat 108 or the valve cage 104 in a radial direction perpendicular to the axial direction, which would not be possible with a standard threaded connection between the projections 160, 164.

In other examples, the valve cage 104 and the valve seat 108 can be removably secured to one another in a different manner. In some examples, the projection 160 can instead take the form of a tab, a fastener, or other structure that securely but releasably engages a portion (e.g., a recess, an undercut) of the valve seat 108. In some examples, the valve cage 104 can include multiple (e.g., two) projections 160 (e.g., threads) that securely but releasably engage a portion of the valve seat 108. Alternatively or additionally, the projection 164 can instead take the form of a tab, a fastener, or other structure that securely but releasably engages a portion (e.g., a recess, an undercut) of the valve cage 104. In some examples, the valve seat 108 can include multiple (e.g., two) projections 164 (e.g., threads) that securely but releasably engage a portion of the valve cage 104. Moreover, in some examples, the projection 160 can extend radially inward or in a direction that is not perpendicular to the longitudinal axis 128, while the projection 164 can extend radially outward or in a direction that is not perpendicular to the longitudinal axis 128. As an example, the projection 160 may extend radially outward from the valve cage 104 in a direction that is substantially but not exactly perpendicular to the longitudinal axis 128 (i.e., the projection 160 is slightly inclined relative to the perpendicular), and/or the projection 164 may extend radially inward from the valve seat 108 in a direction that is substantially but not exactly perpendicular to the longitudinal axis 128.

As illustrated in FIG. 2, the sealing element 112 in this example takes the form of a spiral wound gasket generally arranged to effect a seal between the valve seat 108 and a valve body in which the valve trim assembly 100 is disposed. In other examples, the sealing element 112 can instead take the form of a different type of gasket (e.g., a flat sheet), an o-ring, a C-seal, or other sealing element that performs the intended functionality. The sealing element 112 has a substantially annular body 200 and a projection 204 that is configured to engage a corresponding projection 208 of the valve seat 108, thereby loosely but removably securing the valve seat 108 and the sealing element 112 to one another. As with the projections 160, 164, the projections 204, 208 can be formed using any traditional manufacturing techniques or any of the additive manufacturing techniques described above.

The projection 204 in this example extends radially inward from the sealing element 112 in a direction perpendicular to the longitudinal axis 128. More particularly, the projection 204 extends radially inward from the annular body 200 at a position just below but immediately adjacent a first or upper end 212 of the sealing element 112.

The projection 208 in this example takes the form of a single thread, but one that extends radially outward from the second mounting flange 148 of the valve seat 108 (rather than radially inward, like the projection 204). Thus, the projection 208 also extends in a direction perpendicular to the longitudinal axis 128, but in a direction opposite the projection 204. The projection 208 extends radially inward from the second mounting flange 148 at a position approximately halfway between a second or lower end 216 of the valve seat 108 (opposite the first or upper end 176) and a shoulder 220 of the valve seat 108 (defined by a bottom surface of the ring-shaped body 140). The projection 208 thus has a portion that protrudes outward, into the second or lower annular recess 156, thereby dividing the second annular recess 156 into a first or upper portion and a second or lower portion.

The process of removably securing the valve seat 108 and the sealing element 112 similarly involves arranging a top portion of the sealing element 112 at least partially within the second annular recess 156 of the valve seat 108 such that the projection 204 is captured within the first portion of the annular recess 156 and engages the projection 208. In this example, this involves rotating the top portion of the sealing element 112, particularly the projection 204, beyond the projection 208. In other examples, the second mounting flange 148 of the valve seat 108 can be rotated (instead of the sealing element 112) or the top portion of the sealing element 112 can be positioned in the proper place in a different manner. While the sealing element 112 does not, in this example, include an undercut (as the valve seat 108 does to facilitate engagement between the projections 160, 164), the sealing element 112 may, in other examples, include an undercut arranged to engage a portion of the projection 208. In any event, there exists a small gap 232 between the shoulder 220 of the valve seat 108 and the projection 204, thereby allowing the portion of the sealing element 112 positioned above the projection 208 to move (e.g., float), within the gap 232, while the valve seat 108 and the sealing element 112 are attached to one another. Thus, for example, the valve seat 108 is movable relative to the valve cage 104 (and vice-versa) in an axial direction along the longitudinal axis 128 without moving (e.g., rotating) the valve seat 108 or the valve cage 104 in a radial direction perpendicular to the axial direction, which would not be possible with a standard threaded connection between the projections 160, 164.

In other examples, the valve seat 108 and the sealing element 112 can be removably secured to one another in a different manner. In some examples, the projection 208 can instead take the form of a tab, a fastener, or other structure that securely but releasably engages a portion (e.g., a recess, an undercut) of the sealing element 112. Moreover, in some examples, the projection 204 can extend radially outward or in a direction that is not perpendicular to the longitudinal axis 128, while the projection 208 can extend radially inward or in a direction that is not perpendicular to the longitudinal axis 128. As an example, the projection 204 may extend in a direction that is substantially but not exactly perpendicular to the longitudinal axis 128 (i.e., the projection 204 is slightly inclined relative to the perpendicular), and/or the projection 208 may extend in a direction that is substantially but not exactly perpendicular to the longitudinal axis 128 (i.e., the projection 204 is slightly inclined relative to the perpendicular). Furthermore, in other examples, the sealing element 112 can be removably secured to the valve cage 104, rather than the valve seat 108, in the above-described manner.

Figure 3:
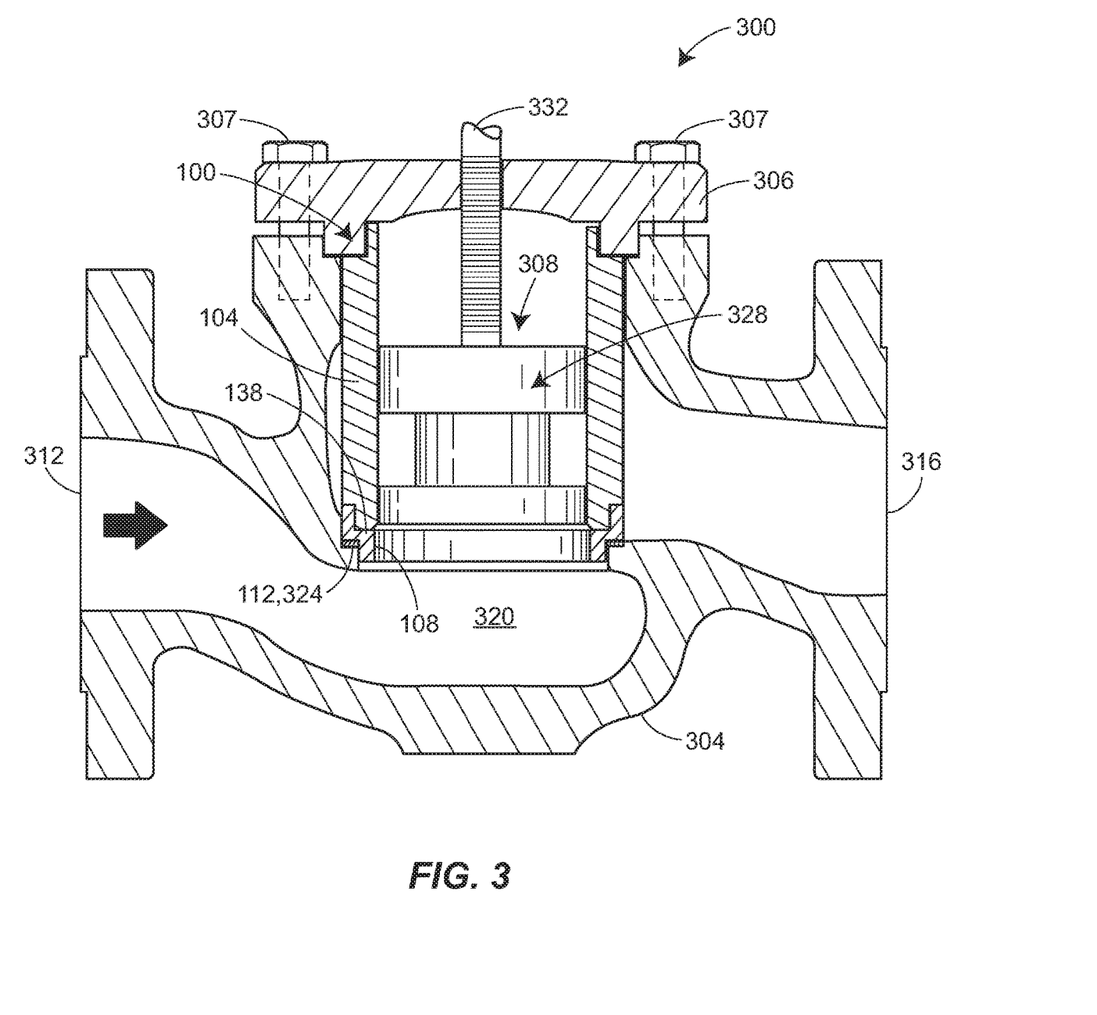
FIG. 3 is a cross-sectional view of a process control valve including the modular valve trim assembly of FIGS. 1 and 2.

As discussed above, the valve cage 104 and the valve seat 108, and the valve seat 108 and the sealing element 112, can be loosely and removably secured to one another in a quick and easy manner, e.g., without using any tools or fixtures. Once the valve cage 104 and the valve seat 108 are removably secured to one another, and the valve seat 108 and the sealing element 112 are removably secured to one another, thereby forming the unitary or modular valve trim assembly 100, the valve trim assembly 100 can be quickly and easily installed in an exemplary process control valve 300 by dropping the valve trim assembly 100 in a valve body 304 of the process control valve 300, as shown in FIG. 3.

The process control valve 300 is a sliding stem type control valve (e.g., a Fisher® ED valve) that includes the valve body 304, the valve trim assembly 100 (which is disposed in the valve body 304), a bonnet 306 coupled to the valve body 304 via a plurality of fasteners 307, and a control element 308 movably disposed in the valve body 304 for controlling the flow of fluid therethrough, and. As briefly noted above, one of ordinary skill in the art will appreciate that while the control element 308 and the bonnet 306 are described herein as being separate from the modular valve trim assembly 100, the modular valve trim assembly 100 can, in other examples, include the control element 308 (or portions thereof) and/or the bonnet 310. In these other examples, the control element 308 (or portions thereof)

and/or the bonnet 306 can be loosely but securely coupled to components of the valve trim assembly 100.

The valve body 304 in this example is a globe-style valve body that defines an inlet 312, an outlet 316, and a fluid flow path 320 extending between the inlet 312 and the outlet 316. The fluid flowing through the fluid flow path 320 may be a gas (e.g., air, natural gas) or a liquid (e.g., water, liquefied natural gas). When the modular trim assembly 100 is disposed in the valve body 304, as it is in FIG. 3, the sealing element 112 is seated or arranged in an annular recess 324 of the valve body 304 defined immediately adjacent the fluid flow path 320, such that (1) a portion of the valve seat 108 is seated on the sealing element 112 and a portion of the valve seat 108 is disposed in the fluid flow path 320, and (2) the second end 138 of the valve cage 104 is seated against the valve seat 108, and the first end 134 of the valve cage 104 is seated against a portion of the bonnet 310. The bonnet 306 helps to retain the valve cage 104 and, thus, the trim assembly 100 as a whole, in the proper position within the valve body 304. The bonnet 306 also applies a downward force on the valve cage 104 (and thus the trim assembly 100 as a whole), which helps to close any small gaps (e.g., the gaps 188, 232) created by the removable connection between the valve cage 104 and the valve seat 108 and the removable connection between the valve seat 108 and the sealing element 112.

The control element 308 includes a valve plug 328 connected to a valve stem 332. The valve plug 328 is movably disposed within the valve cage 104 relative to the valve seat 108 to control the flow of fluid through the flow path 320 of the process control valve 300. The valve stem 332 extends out of the valve body 108 through the bonnet 112 for being coupled to an actuator (not shown) such that the actuator can adjust the position of the control element 308 and, more particularly, the position of the valve plug 328 relative to the flow path 320 to adjust the flow of fluid through the control valve 300.

While not illustrated herein, when it is necessary to repair or replace one or more components of the valve trim assembly 100 (e.g., when the sealing element 112 has worn), the valve trim assembly 100 can be quickly and easily removed from the valve body 304 by removing the bonnet 306 and pulling the valve trim assembly 100 out of the valve body 304. Because the valve cage 104, the valve seat 108, and the sealing element 112 are integrated into the same unit, all three components can be removed from the valve body 304 at the same time, i.e. in one motion. Once the valve trim assembly 100 is removed, the component(s) of the assembly 100 in need of repair can be quickly and easily separated. As an example, a worn sealing element 112 can be decoupled from the valve seat 108 by rotating the projection 204 of the sealing element 112 out of engagement with the projection 208 of the valve seat 108. Any removed components can in turn be repaired or replaced with new but otherwise identical components. The new or repaired component(s) can be securely but removably attached (or re-attached), thereby reforming the modular valve trim assembly 100, at which time the modular valve trim assembly 100 can be re-installed in the valve body 304.

In other examples, the control valve 300 can be a different type of control valve, such as, for example, a rotary control valve (e.g., a Fisher® Vee-Ball™ V150 valve, a Fisher® Vee-Ball™ V300 valve, etc.), a throttle valve, an isolation valve, or other control valve. Moreover, the components of the control valve 300 (e.g., the valve body 304, the bonnet 306, and the control element 308) can vary from what is depicted herein. For example, the inlet 312, the outlet 316, and the fluid flow path 320 extending therebetween can vary in shape and/or size and yet still perform the intended functionality. As another example, the valve plug 328 can instead take the form of a valve disc or any other suitable control member.

FIGS. 4-9 illustrate another example of a unitary or modular valve trim assembly 400 that is constructed in accordance with the principles of the present invention and may be quickly and easily installed in the process control valve 300 or another process control valve. The modular valve trim assembly 400 includes a valve cage 404, a valve seat 408, and a sealing element (not shown, but similar to the sealing element 112). As with the modular valve trim assembly 100 described above, the valve seat 408 can be loosely but removably secured to the valve cage 404, and the sealing element can likewise be loosely but removably secured to the valve seat 408, such that the components of the valve trim assembly 400 are integrated into a single body or unit (thereby facilitating transport and installation) but are movable relative to one another and are easily separable for replacement or repair when necessary.

Figure 4:
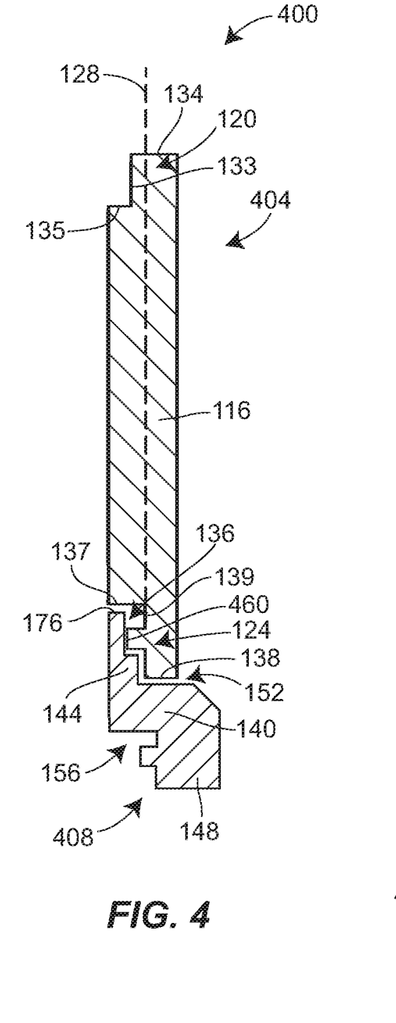
FIG. 4 is a cross-sectional view of a first portion of a second example of a modular valve trim assembly constructed in accordance with the principles of the present invention

The valve cage 404 is similar to the valve cage 104, with common components referenced using common reference numerals, but is different from the valve cage 104 in that the valve cage 404 includes a plurality of projections 460 instead of the projection 160 and each of the projections 460 varies from the projection 160. Likewise, the valve seat 408 is similar to the valve seat 108, with common components referenced using common reference numerals, but is different from the valve seat 108 in that the valve seat 408 includes a plurality of projections 464 instead of the projection 164 and each of the projections 464 varies from the projection 164.

Figure 6:
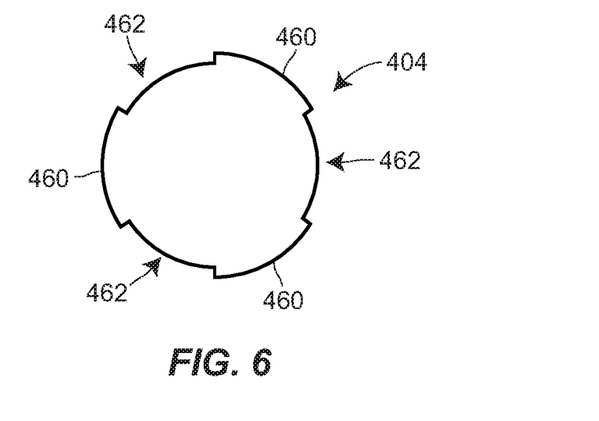
FIG. 6 is a cross-sectional view taken along a bottom portion of a valve cage of the modular valve trim assembly of FIG. 4.
Figure 7:
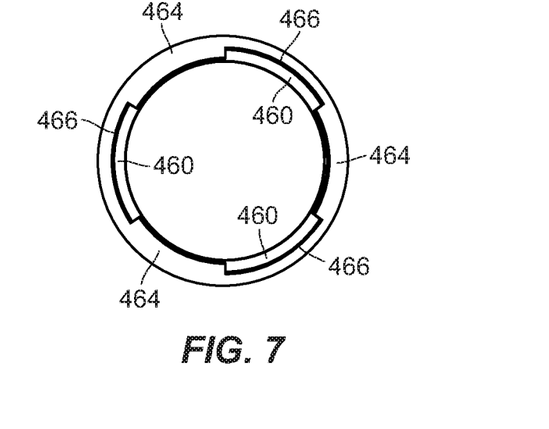
FIG. 7 illustrates the top portion of the valve seat of FIG. 5 disposed in the bottom portion of the valve cage of FIG. 6.

As illustrated in FIGS. 4, 6, and 7, the projections 460 in this example take the form of a plurality of identical segments that extend radially outward from the valve cage 404 in a direction perpendicular to the longitudinal axis 128. More particularly, the projections 460 extend radially outward from the second mounting flange 124 at a position proximate the lower end 138 of the valve cage 404, and, even more particularly, between the third shoulder 137 of the cage wall 116 and the lower end 138 of the valve cage 404. In this example, the valve cage 404 includes three such projections 460 that are circumferentially spaced about the second mounting flange 124, thereby defining three channels 462 between each of the adjacent projections 460. In other examples, however, the valve cage 404 may include only one projection 460 (in which case there would only be one channel 462), two projections 460 (in which case there would be two channels 462), more than three projections 460, or a plurality of differently sized and/or shaped segments. Moreover, in other examples, the projections 460 need not circumferentially spaced apart from one another. Further, in other examples, the projections 460 need not be oriented perpendicular to the longitudinal axis 128. As an example, the projections 460 may be substantially perpendicular to the longitudinal axis 128 (i.e., slightly inclined relative to the perpendicular).

Figure 5:
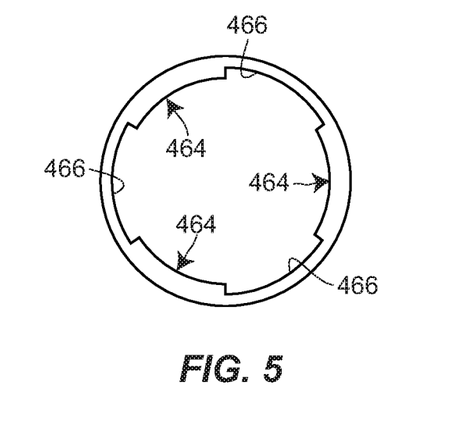
FIG. 5 is a cross-sectional view taken along a top portion of a valve seat of the modular valve trim assembly of FIG. 4.

As also illustrated in FIGS. 4, 5, and 7, the projections 464 in this example take the form of a plurality of identical segments that correspond in shape and size to the projections 460, but the projections 464 extend radially outward from the valve seat 408 (rather than radially inward, as the projections 460 do). Thus, the projections 464 also extend in a direction perpendicular to the longitudinal axis 128, but in a direction opposite the projections 460. The projections 464 extend radially inward from the upper end 176 of the valve seat 408, and, more particularly, from the upper end of the first mounting flange 144 of the valve seat 408. In this example, the valve seat 408 includes three such projections 464, and the projections 464 are circumferentially spaced about the first mounting flange 144, thereby defining three channels 466 between each of the adjacent projections 464. In other examples, however, the valve seat 408 may include only one projection 464 (in which case there would only be one channel 466), two projections 464 (in which case there would be two channels 466), more than three projections 464, and/or a plurality of differently shaped and/or sized segments. Moreover, in other examples, the projections 464 need not circumferentially spaced apart from one another. Further, in other examples, the projections 464 need not be oriented perpendicular to the longitudinal axis 128. As an example, the projections 464 may be substantially perpendicular to the longitudinal axis 128 (i.e., slightly inclined relative to the perpendicular).

Thus, the projections 460 are arranged to engage the projections 464 (and vice-versa) to loosely but removably secure the valve cage 404 and the valve seat 408 to one another. The process of loosely and removably securing the valve cage 404 and the valve seat 408 to one another generally involves several steps. First, the second mounting flange 124 of the valve cage 404 and the first mounting flange 144 of the valve seat 408 are concentrically arranged such that the projections 460 are disposed in the channels 466, respectively, and the projections 464 are disposed in the channels 462, respectively, as illustrated in FIGS. 4 and 7. In this example, the projections 460 are slightly wider than the channels 466 and the projections 464 are slightly wider than the channels 462, though this need not be the case. Second, the valve cage 404 and/or the valve seat 408 is/are rotated such that the projections 460 are substantially moved out of the channels 466 and the projections 460 are substantially aligned with the projections 464, respectively, which are immediately above (when viewed in FIG. 8) the projections 460. In this example, the valve cage 404 is rotated a pre-determined distance (e.g., a quarter of a turn, a third of a turn, or some other value less than one turn) relative to the valve seat 408 to reach the desired positioning. The pre-determined distance may, in some cases, be defined by one or more stops (in the form of, for example, indentations, incomplete channels, or the like) disposed on the valve cage 404 and/or the valve seat 408. In other examples, however, the valve seat 408 may be rotated relative to the valve cage 404 or the valve cage 404 and/or the valve seat 408 may be manipulated in a different manner to reach the desired positioning.

Figure 8:
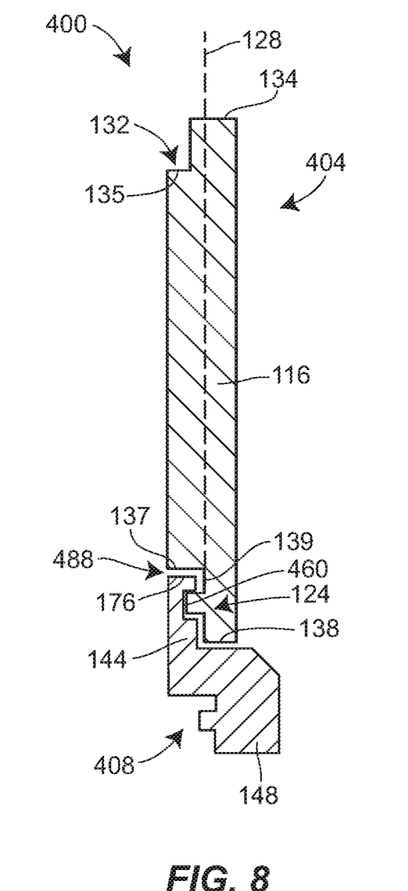
FIG. 8 is similar to FIG. 4, but shows the valve cage and the valve seat loosely but removably secured to one another.
Figure 9:
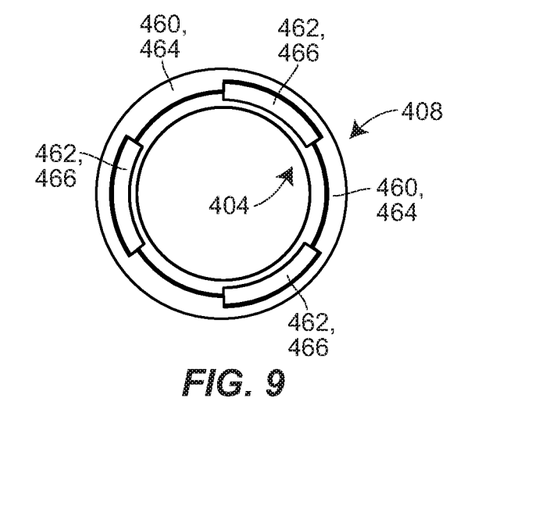
FIG. 9 is similar to FIG. 7, but shows the valve cage and the valve seat loosely but removably secured to one another.

In any case, the projections 460 are substantially if not fully captured in recessed areas 468 defined by and between the projections 464, respectively, and portions of the first mounting flange 144 below the projections 464, respectively, and the projections 460 interferingly engage the projections 464, respectively, in a manner that secures the valve cage 404 to the valve seat 408 (and vice-versa). At the same time, there exists a small vertical gap 488 between the third shoulder 137 of the valve cage 404 and each of the projections 464, thereby allowing the projections 464 to move (e.g., float) within the gaps 488, respectively, while the valve cage 404 and the valve seat 408 are attached to one another. Thus, for example, the valve seat 408 is movable relative to the valve cage 404 (and vice-versa) in an axial direction along the longitudinal axis 128 without moving (e.g., rotating) the valve seat 108 or the valve cage 104 in a radial direction perpendicular to the axial direction, which would not be possible with a standard threaded connection between the projections 460, 464.

While not illustrated herein, it will be appreciated that the sealing element of the valve trim assembly 400, which is similar to the sealing element 112, may be loosely but securely coupled to the valve seat 408 in a similar manner. To that end, the sealing element may include a plurality of projections, similar to, for example, the projections 460, arranged to respectively engage a plurality of projections, similar to, for example, the projections 464, of the valve seat 408.

It will also be appreciated that the valve trim assembly 400 may include a bonnet (e.g., a bonnet similar to the bonnet 306) that can be loosely but securely coupled to the valve cage 404 in a similar manner. In particular, the bonnet may include a plurality of projections, similar to the projections 464, that are arranged to engage a respectively plurality of projections, similar to the projections 460, formed at or proximate the upper end 134 of the valve cage 404.

Figure 10:
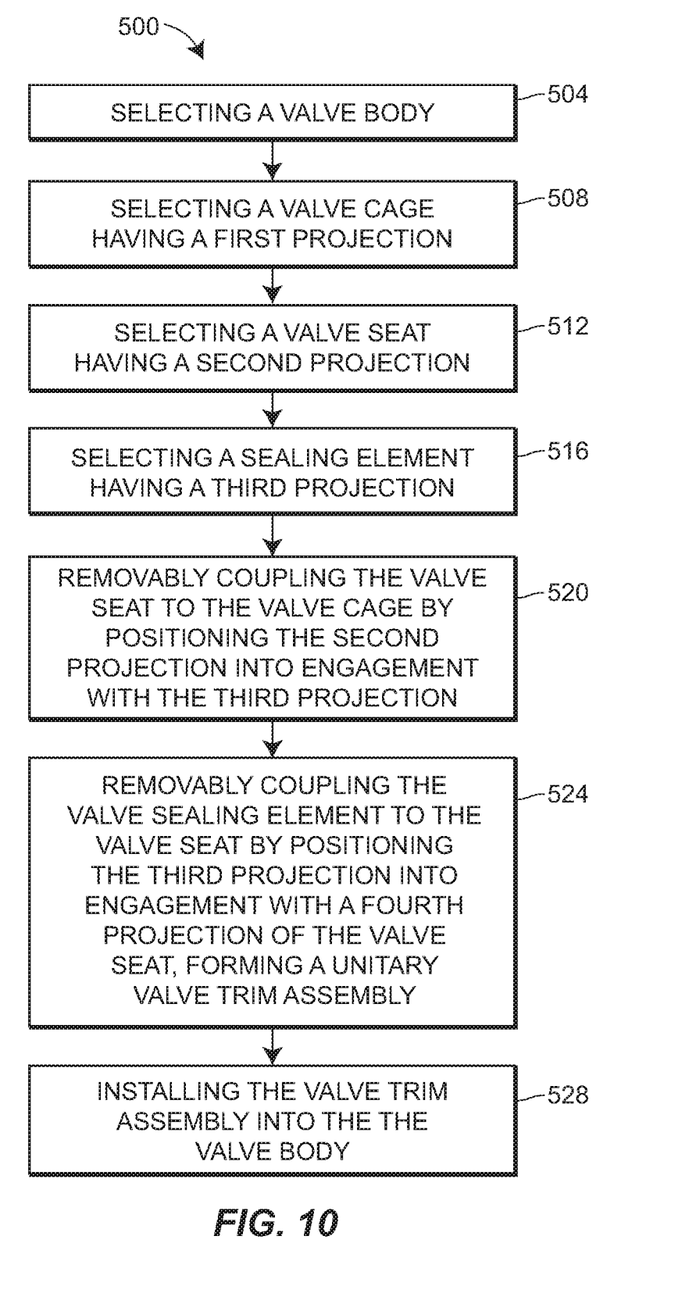
FIG. 10 is a process flow chart showing one example of a method of providing a process control valve in accordance with the principles of the present invention.

FIG. 10 depicts an exemplary method or process 500 of providing a process control valve (e.g., the process control valve 300) having a unitary or modular valve trim assembly (e.g., the trim assembly 100, the trim assembly 400). The method 500 is performed in the order shown and described herein, but may be implemented in or according to any number of different orders. In other examples, the method 500 may include additional, fewer, or different acts. For example, the act 504 may not need to be performed when a valve body has already been selected.

As illustrated in FIG. 10, the method 500 in this example includes the act 504 of selecting a valve body (e.g., the valve body 304) defining an inlet, an outlet, and a fluid flow passageway defined between the inlet and the outlet, the act 508 of selecting a valve cage (e.g., the valve cage 104, the valve cage 404) having a first projection (e.g., a projection 160, a projection 460), the act 512 of selecting a valve seat (e.g., the valve seat 108, the valve seat 408) having a second projection (e.g., a projection 164, a projection 464), and the act 516 of selecting a sealing element (e.g., the sealing element 112) having a third projection (e.g., a projection 204). It will be appreciated that these acts (504, 508, 512, 516) can be performed in any number of different orders.

The method 500 also includes the act 520 of removably coupling the selected valve seat to the selected valve cage by positioning the second projection (of the valve seat) into engagement with the first projection (of the valve cage). The act 520 may, in some examples, involve the act of rotating the second projection into engagement with the first projection. The method 500 also includes the act 524 of removably coupling the selected sealing element to the selected valve seat by positioning the third projection into engagement with a fourth projection (e.g., a projection 208) of the valve seat. The act 524 may, in some examples, involve the act of rotating the third projection into engagement with the fourth projection. In any event, it will be appreciated that once the acts 520, 524 are performed (regardless of the order in which they are performed), the unitary or modular valve trim assembly is formed. It will also be appreciated that the acts 520, 524 will typically be performed outside of the valve body (i.e., prior to any components of the modular valve trim assembly being arranged in the valve body).

The method 500 further includes the act 528 of installing the valve trim assembly in the valve body and coupling a bonnet (e.g., the bonnet 306) to the valve body. In some cases, the method 500 may further include the act of removing the valve trim assembly from the valve body, e.g., when one or more components of the valve trim assembly are in need of repair or replacement, by pulling the unitary valve trim assembly out of the valve body in one motion.

The invention claimed is:

1. A method of assembling a process control valve, the method comprising:
   selecting a valve body defining an inlet, an outlet, and a fluid flow passageway defined between the inlet and the outlet;
   selecting a valve cage defining a longitudinal axis and having a first projection;
   selecting a valve seat having a second projection;
   selecting a sealing element having a third projection;
   loosely but removably securing the valve seat to the valve cage by positioning the second projection into engagement with the first projection, wherein when the second projection engages the first projection to loosely but removably secure the valve seat to the valve cage, the valve seat is movable relative to the valve cage in an axial direction along the longitudinal axis of the valve cage without rotating the valve seat or the valve cage;
   removably coupling the sealing element to the valve seat by positioning the third projection into engagement with a fourth projection of the valve seat, thereby forming a fully assembled unitary valve trim assembly; and
   installing the valve trim assembly in the valve body.

2. The method of claim 1, wherein loosely but removably securing the valve seat to the valve cage further comprises rotating the second projection into engagement with the first projection.

3. The method of claim 1, wherein removably coupling the sealing element to the valve seat further comprises rotating the third projection into engagement with the fourth projection.

4. The method of claim 1, further comprising removing the valve trim assembly by pulling the valve cage out of the valve body.

5. A unitary valve trim assembly that can be easily installed in and removed from a valve body of a process control valve, the valve trim assembly comprising:
   a valve cage having a first projection that extends in a first direction that is perpendicular to a longitudinal axis of the valve cage; and
   a valve seat having a second projection that extends in a second direction, opposite the first direction, that is perpendicular to the longitudinal axis, the second projection arranged to engage the first projection to loosely but removably secure the valve seat to the valve cage,
   wherein when the second projection engages the first projection to loosely but removably secure the valve seat to the valve cage, the valve seat is movable relative to the valve cage in an axial direction along the longitudinal axis of the valve cage without rotating the valve seat or the valve cage, and
   wherein the valve seat is loosely but removably secured to the valve cage when the valve trim assembly is fully assembled.

6. The valve trim assembly of claim 5, wherein the first projection extends radially outward, and wherein the second projection extends radially inward.

7. The valve trim assembly of claim 5, wherein the first projection comprises a first thread, and wherein the second projection comprises a second thread.

8. The valve trim assembly of claim 5, wherein the second projection is captured in a gap formed between the first projection and a shoulder of the valve cage, the second projection movable in the gap without rotating the valve seat or the valve cage.

9. The valve trim assembly of claim 5, wherein the valve cage has an end seated against a portion of the valve seat, the first projection being disposed between the end and a shoulder of the valve cage.

10. The valve trim assembly of claim 5, further comprising a sealing element removably coupled to the valve seat.

11. The valve trim assembly of claim 10, wherein the sealing element has a third projection arranged to engage a fourth projection of the valve seat to removably couple the sealing element to the valve seat, and wherein when the third projection engages the fourth projection to removably couple the sealing element to the valve seat, the sealing element is movable relative to the valve seat in the axial direction without rotating the sealing element or the valve seat.

12. The valve trim assembly of claim 11, wherein the third and fourth projections extend in opposite directions.

13. The valve trim assembly of claim 5, wherein the first projection is a single first thread and the second projection is a single second thread.

14. A unitary valve trim assembly that can be easily installed in and removed from a valve body of a process control valve, the valve trim assembly comprising:
   a valve cage defining a longitudinal axis and having a first projection;
   a valve seat having a second projection arranged to engage the first projection to loosely but removably secure the valve seat to the valve cage, wherein when the second projection engages the first projection to loosely but removably secure the valve seat to the valve cage, the valve seat is movable relative to the valve cage in an axial direction along the longitudinal axis of the valve cage without rotating the valve seat or the valve cage; and
   a sealing element having a third projection arranged to engage a fourth projection of the valve seat to removably couple the sealing element to the valve seat,
   wherein the first projection is a single first thread and the second projection is a single second thread, and
   wherein the valve seat is loosely but removably secured to the valve cage and the sealing element is removably coupled to the valve seat when the valve trim assembly is fully assembled.

15. The valve trim assembly of claim 14, wherein the sealing element surrounds a portion of the valve seat.

16. The valve trim assembly of claim 14, wherein the sealing element comprises a gasket.

17. The valve trim assembly of claim 14, wherein the first and fourth projections extend in a first direction that is perpendicular to the longitudinal axis of the valve cage, and wherein the second and third projections extend in a second direction, opposite the first direction, that is perpendicular to the longitudinal axis of the valve cage.

18. The valve trim assembly of claim 14, wherein the first and fourth projections each extend radially outward, and wherein the second and third projections each extend radially inward.

19. The valve trim assembly of claim 14, wherein the third projection is captured in a gap formed between the fourth projection and a shoulder of the valve seat, the third projection movable in the gap without rotating the sealing element or valve seat.

20. The valve trim assembly of claim 14, wherein the second projection is captured in a gap formed between the first projection and a shoulder of the valve cage, the second projection movable in the gap without rotating the valve seat or the valve cage.

21. The valve trim assembly of claim 14, wherein the valve cage has an end seated against a portion of the valve seat, the first projection being disposed between the end and a shoulder of the valve cage.

* * * * *

UNITED STATES PATENT AND TRADEMARK OFFICE
CERTIFICATE OF CORRECTION

PATENT NO. : 10,724,642 B2  
APPLICATION NO. : 15/961582  
DATED : July 28, 2020  
INVENTOR(S) : Michael W. McCarty Page 1 of 1

It is certified that error appears in the above-identified patent and that said Letters Patent is hereby corrected as shown below:

On the Title Page

In Item (63), under "Related U.S. Application Data", in Column 1, Line 1, delete "(63) Continuation of application" and insert -- (60) Provisional application --.

In the Specification

In Column 3, Line 40, delete "invention" and insert -- invention; --.

In Column 7, Line 25, delete "o-ring" and insert -- O-ring --.

In Column 9, Lines 32-33, delete "valve body 108 through the bonnet 112" and insert -- valve body 304 through the bonnet 306 --.

In Column 9, Line 48, delete "assembly" and insert -- valve trim assembly --.

Signed and Sealed this  
Twenty-seventh Day of April, 2021

Drew Hirshfeld  
*Performing the Functions and Duties of the*  
*Under Secretary of Commerce for Intellectual Property and*  
*Director of the United States Patent and Trademark Office*